Jan. 19, 1954  D. S. HOYNES  2,666,800

METHOD AND DEVICE FOR INTERCONNECTING BATTERY CELLS

Filed Aug. 8, 1952

Inventor
DAGFIN S. HOYNES
By
Walter S. Paul
Attorneys

Patented Jan. 19, 1954

2,666,800

UNITED STATES PATENT OFFICE 2,666,800

METHOD AND DEVICE FOR INTERCONNECTING BATTERY CELLS

Dagfin S. Hoynes, Silver Spring, Md.

Application August 8, 1952, Serial No. 303,453

5 Claims. (Cl. 136—110)

(Granted under Title 35, U. S. Code (1952), sec. 266)

The invention described herein may be manufactured and used by or for the Government of the United States of America for governmental purposes without the payment of any royalties thereon or therefor.

The present invention relates generally to batteries and specifically to a means for connecting in series dry cell batteries of the mercuric type.

Due to corrosive effects of gases escaping from dry cells, common methods now in use for connecting a group of dry cells together are inefficient and cause the cells to either deteriorate quickly or to deliver less than their rated power. Such methods now in use include stacking of the cells under pressure of springs to assure contact of the opposite terminals of adjacent cells, or by welding the terminals to metal strips. Spot welding of a metal strip to a completed cell frequently damages the cell by the heat of the welding operation, and the strips are subject to corrosive action by the gasses.

The present invention has for its principal object to provide a more efficient method and means for connecting adjacent cells together mechanically and electrically.

Another object is to provide means for connecting cells together without welding or other application of heat to a completed cell.

A still further object is to provide an inexpensively made and easily applied means for joining the pole of one cell to the pole of the other.

Other objects and advantages of the invention will hereinafter become more fully apparent from the following description of the annexed drawings which illustrate preferred embodiments and wherein.

Figure 1:
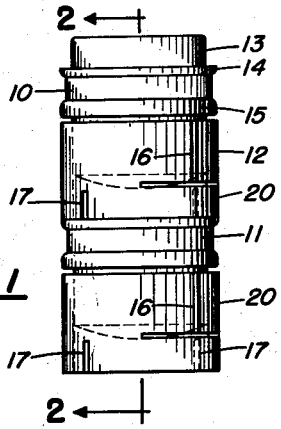
Fig. 1 is a plan view in elevation of two cells connected by one embodiment of the invention.
Figure 2:
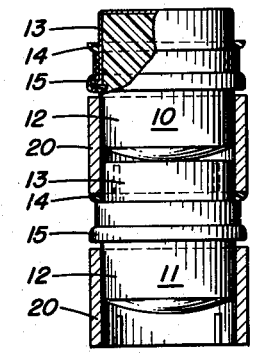
Fig. 2 is a view in section taken on line 2—2 of Fig. 1.
Figure 3:
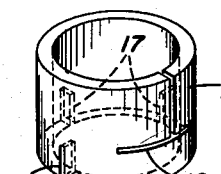
Fig. 3 is an isometric plan view of the embodiment shown in Figs. 1 and 2.

Referring to the drawing in which like numerals indicate like elements throughout the several views, Figs. 1 and 2 show one embodiment of the invention joining two dry cells 10 and 11 of the mercuric oxide type which have a generally cylindrical form, having a case 12 and a cap 13 electrically separated by an insulating ring 14. Case 12 has a rolled shoulder 15 near its upper edge. The invention as embodied in these two views and in Fig. 3 comprises a ring 20 of metal having at least one T-slot 16 in its upper length and several, in this case three, slots 17 upwards from its bottom edge. The dimensions of ring 20 are such that the case 12 and the cap 13 fit tightly into the ring 20 at either end to provide electrical contact between the cap 13 and case 12 of adjacent cells 11 and 10 respectively, the slots 16 and 17 allowing sufficient expansion of ring 20 to permit a snug engagement, ring 20 preferably being constructed of resilient metal.

Figure 4:
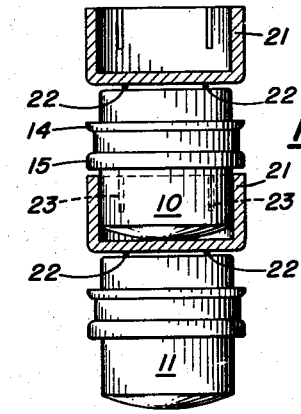
Fig. 4 is a view in partial section showing a second embodiment of the invention.

In Fig. 4, another embodiment of the invention is shown in section midway between cells 10 and 11 and is in the form of a cup 21 spot welded at 22 to the cap 13 of the cell. Preferably the cup 21 and cap 13 are spot-welded together before packing of the cell with its active ingredient. Cup 21 may also be provided with slots as at 23 to permit using resilient metal for the cup.

Figure 5:
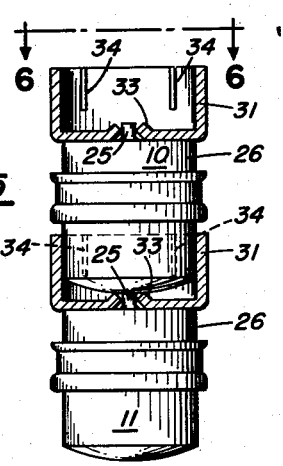
Fig. 5 is a view partly in section of a third embodiment of the invention.
Figure 6:
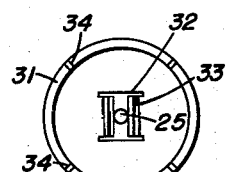
Fig. 6 is a top view of the embodiment shown in Fig. 5.

The embodiment shown in Fig. 5 is applicable for cells which have a protruding electrode 25 extending from the cap 26, and the cup 31 in this embodiment is provided with an H-slot 32 in its bottom, the slot edges 33 bent upwardly to receive the electrode 25. Cup 31 may also be slotted as at 34.

Figure 7:
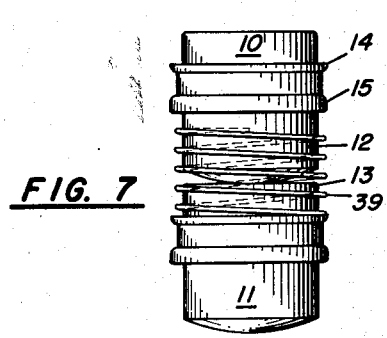
Fig. 7 is a plan view of a fourth embodiment of the invention.

In Fig. 7 a further embodiment takes the form of a spring 39 to engage the case 12 and cap 13 of the cells 10 and 11 respectively, providing an adequate electrical connection therebetween and allowing some flexibility to a stack of assembled cells.

Figure 8:
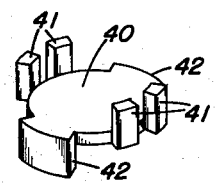
Fig. 8 is an isometric view of the fifth embodiment of the invention.

The embodiment of Fig. 8 is a stamped metal clamp 40 having upwardly extending lugs 41 and downwardly extending lugs 42 for similar engagement with the case 12 and the cap 13 of adjacent cells, the lugs being sufficiently resilient to provide the necessary gripping action.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. In a device of the character described, means for electrically and mechanically joining together a tandem or longitudinally stacked pair of dry cells each having case and cap terminals comprising a substantially cylindrical metallic member having substantially the same diameter at its upper and lower ends, means on the upper end of said member to encompass and firmly grip in electrical contact the case terminal of the upper of said pair of cells, and means on the lower end of said member engageable with the cap terminal of the lower of said pair of cells.

2. The device as set forth in claim 1 in which said member is constructed of resilient material and has downwardly extending slots cut in its upper end to provide for slight expansion over the case terminal of the upper one of the pair of cells.

3. The device as set forth in claim 2 in which the lower end of said member has a surface coplanar with the surface of the cap terminal of the lower one of the pair of cells.

4. The device as set forth in claim 3 in which the lower end of said member is slotted to receive in gripping condition the cap terminal of the lower one of the pair of cells.

5. The device as set forth in claim 3 in which the lower end of said member is joined to the cap terminal of the lower end of said pair of cells by welding before said cell is assembled.

DAGFIN S. HOYNES.

References Cited in the file of this patent

UNITED STATES PATENTS

| Number | Name | Date |
| --- | --- | --- |
| 1,464,573 | Heise et al. | Aug. 14, 1923 |
| 2,116,091 | Williams | May 3, 1938 |
| 2,117,792 | Lange | May 17, 1938 |

FOREIGN PATENTS

| Number | Country | Date |
| --- | --- | --- |
| 494,929 | Germany | Mar. 31, 1930 |